United States Patent [19]

Hepner et al.

[11] 4,236,783
[45] Dec. 2, 1980

[54] ELECTRICALLY-CONTROLLED OPTICAL BRANCH CONNECTION

[75] Inventors: Georges Hepner; Jean-Paul Castera, both of Paris, France

[73] Assignee: Thomson-CSF, Paris, France

[21] Appl. No.: 967,255

[22] Filed: Dec. 5, 1978

[30] Foreign Application Priority Data

Dec. 9, 1977 [FR] France ............... 77 37228

[51] Int. Cl.³ .................................... G02B 5/14
[52] U.S. Cl. ....................... 350/96.13; 350/96.29
[58] Field of Search ............. 350/96.13, 96.14, 96.29

[56] References Cited

U.S. PATENT DOCUMENTS

| | | | |
|---|---|---|---|
| 3,756,690 | 9/1973 | Borrelli et al. ............ | 350/96.29 |
| 3,990,776 | 11/1976 | Tseng et al. .............. | 350/96.13 |
| 4,148,556 | 4/1979 | Sauter et al. ............. | 350/96.13 |
| 4,153,329 | 5/1979 | Gillette .................. | 350/96.13 |

Primary Examiner—Stewart J. Levy
Attorney, Agent, or Firm—Cushman, Darby & Cushman

[57] ABSTRACT

The invention relates to an electrically-controlled optical branch connection, for the guiding of an optical radiation from one input optical fibre to one of n output fibres or vice versa, obtained by associating a plurality of basic cells. Each basic cell comprises an optical guide capable of being controlled electrically so as to produce or not produce, depending on the control signal, a rotation through $\pi/2$ of the linear polarization at the input of the guide. The axes are so chosen that the polarized radiation issuing from the guide is propagated in the ordinary direction or the extraordinary direction in a bi-refracting plate.

13 Claims, 4 Drawing Figures

ELECTRICALLY-CONTROLLED OPTICAL BRANCH CONNECTION

The invention relates to the field of signal transmission through optical fibres, more particulary for telecommunications applications. It is known for the purpose of transmitting an electric signal to convert it into radiated energy transmitted to an optical fibre or to a bunch of optical fibres which guides this radiated energy toward a receiver. After an optical-electric conversion, this receiver restores the transmitted electric signal.

Such an optical guide system requires, for a flexible utilization of the equipment, electrically-controlled branch connections so that the radiated energy can be transmitted at will in one of a plurality of optical fibres.

An object of the invention is to provide an optical branch connection to be connected to optical fibres, this electrically-controlled branch connection permitting the transmission of the incident radiated energy in one fibre to a selected one of $2^n$ fibres.

According to the invention there is provided an electrically controlled optical branch connection for optical fibres, comprising a plurality of adjacent basic cells, each of which cells comprises at least a radiation guide capable of introducing under electrical control, a change in the direction of polarization of an input optical radiation linearly polarized, the radiation having thus one of two possible directions of polarization, and a bi-refracting plate capable of ensuring the propagation of linearly polarized radiation along one of two directions according to the direction of polarization of the radiation transmitted thereto, the radiation emerging from said plate after propagation along one and the other directions being spatially separated, said guide and said plate being fixed one relative to the other and said two possible directions of polarization at the output of said guide respectively corresponding to said two propagation directions in said plate.

For a better understanding of the invention and to show how the same may be carried into effect, reference will be made to the following description and the attached drawings among which:

Figure 1:
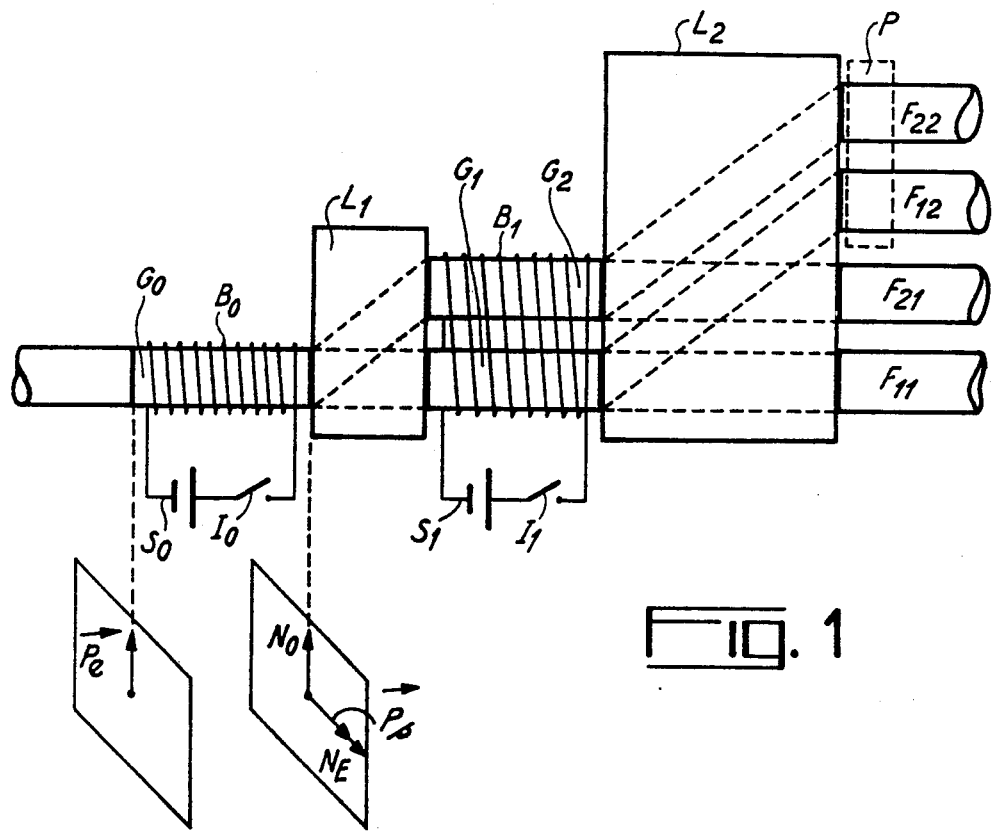
FIG. 1 represents diagrammtically in plan a branch connection, having two stages, according to the invention which couples a fibre receiving the incident light to one of four output fibres.

FIG. 1 represents diagrammatically the switch employing fibres according to the invention. The incident radiated energy arrives through the fibre F and issues from the switch through one of the fibres $F_{11}$, $F_{12}$, $F_{21}$ or $F_{22}$. For this purpose, a light guide device $G_0$, in which may be effected a polarization rotation under electric control, receives the radiated energy emitted by the fibre F. The light which issues from the guide device and has either of two predetermined directions of polarization is received by a bi-refracting plate in which the light is propagated in either of two predetermined directions, namely an ordinary direction or an extraordinary direction, depending on the polarization of the incident light. The light issues from this plate either in a zone $Z_1$ if the propagation was direct or in zone $Z_2$ if the direction of propagation was deflected. The length of propagation in the bi-refracting plate must be sufficient to ensure that the issuing beam is completely received in it by a single guide element, the zones $Z_1$ and $Z_2$ being separate: this length is a function of the angle of deflection in the bi-refracting plate. The radiation issuing through either of two zones $Z_1$ and $Z_2$ is received by either of two light guides $G_1$ and $G_2$. For a branch connection having two branches, these two guides are two fibres. For a branch connection having four output branches as shown in the figure, these two guides may or may not introduce a polarization rotation controlled electrically. If there is no polarization rotation in $G_1$ or $G_2$, the light issuing from one of the guides $G_1$ or $G_2$ is propagated respectively in the ordinary direction or the extraordinary direction in a bi-refracting plate $L_2$, issuing from this plate and is guided in one of two fibres respectively $F_{11}$ and $F_{22}$. If there was a polarization rotation in one of the guides $G_1$ or $G_2$, the light is propagated in the bi-refracting plate $L_2$ in the extraordinary direction if it comes from the guide $G_1$, issues from this plate and is received and guided by the fibre $F_{12}$ or is propagated in the ordinary direction if it comes from the guide $G_2$, the polarization having rotated twice through 90°, it is then guided by the fibre $F_{21}$. To obtain a multiple branch connection it is possible to replace these fibres $F_{11}$, $F_{12}$, $F_{21}$ and $F_{22}$ by guides capable of effecting, as a function of a control signal, a polarization rotation as achieved by the guides $G_0$, $G_1$ and $G_2$. A bi-refracting plate is then placed for receiving and issuing radiation and ensuring the propagation in one of the ordinary or extraordinary directions in a propagation length which is sufficient to ensure that the regions of the plate from which the radiation is capable of issuing are separate. The number of elementary cells, each formed by at least one guide capable of introducing a polarization rotation and a bi-refracting plate, is not limited and such an association constituted a branch connection between a transmitting fibre and $2^N$ receiving fibres.

For the purpose of controlling the polarization rotation in the guide $G_0$ on one hand and the guides $G_1$, $G_2$ on the other, the drawing shows coils $B_0$ and $B_1$ surrounding the guides $G_0$ and $G_1$, $G_2$, respectively; these coils carry current when the switches $I_0$ and $I_1$ respectively are closed, supply voltages being supplied by sources $S_0$ and $S_1$ respectively. When the circuits carry current, the guides are subjected to a magnetic field applied in the direction of propagation. The magnetic field applied to the magneto-optical guide has for effect to rotate this polarization through 90° by the Faraday effect. The initial direction of polarization of the radiation is chosen to be one of the neutral axes $N_O$ or $N_E$ of the bi-refracting plate so that the two distinct modes of propagation characterized by the different indices of refraction (ordinary and extraordinary indices) and orthogonal polarizations are used, one excluding the other.

The operation of the branch connection has been given in assuming that the incident radiation came from one fibre and must be transmitted to one of four output fibres. The branch connection may also operate in the other direction, that is to say the radiation may come from alternately four (or more) fibres and be directed to a single optical fibre. The device may operate in this way but the radiation issuing from the incident fibres must be suitably polarized so that it is propagated in the bi-refracting plate $L_2$ in the desired direction. For example, if the radiation is incident through one of the fibres $F_{22}$ or $F_{12}$, it must be polarized in a direction corresponding to the extraordinary index of the bi-refracting plate. If the radiation does not have this polarization, there must be introduced between the bi-refracting plate P, shown in dotted lines in the drawing, so that the radiation entering the plate $L_2$ is polarized in a direction which corresponds to an extraordinary propagation direction.

These two types of operation may be summarized in the following tables, 0 indicating that no control is applied to the corresponding guides, 1 indicating that a control is applied and I that the state of the control signal may be any state, D indicating that the radiation is deflected in the corresponding plate and ND indicating that it is not deflected.

In operating from F to $F_{12}$, $F_{21}$, $F_{11}$ or $F_{22}$:

| Incidence | $G_0$ | $L_1$ | $G_1$ | $G_2$ | $L_2$ | Issuing from |
|---|---|---|---|---|---|---|
| F | 0 | ND | 0 | I | ND | $F_{11}$ |
| F | 0 | ND | 1 | I | D | $F_{12}$ |
| F | 1 | D | 1 | 0 | D | $F_{22}$ |
| F | 1 | D | 1 | 1 | ND | $F_{21}$ |

In operating from $F_{11}$, $F_{21}$, $F_{12}$ or $F_{22}$ to F:

| Incidence | P | $L_2$ | $G_2$ | $G_1$ | $L_1$ | $G_0$ | Issuing from |
|---|---|---|---|---|---|---|---|
| $F_{11}$ | — | ND | I | 0 | ND | 0 | F |
| $F_{21}$ | — | ND | 1 | I | D | 1 | F |
| $F_{12}$ | P | D | I | 1 | ND | 0 | F |
| $F_{22}$ | P | D | 0 | I | D | 1 | F |

Figure 2:
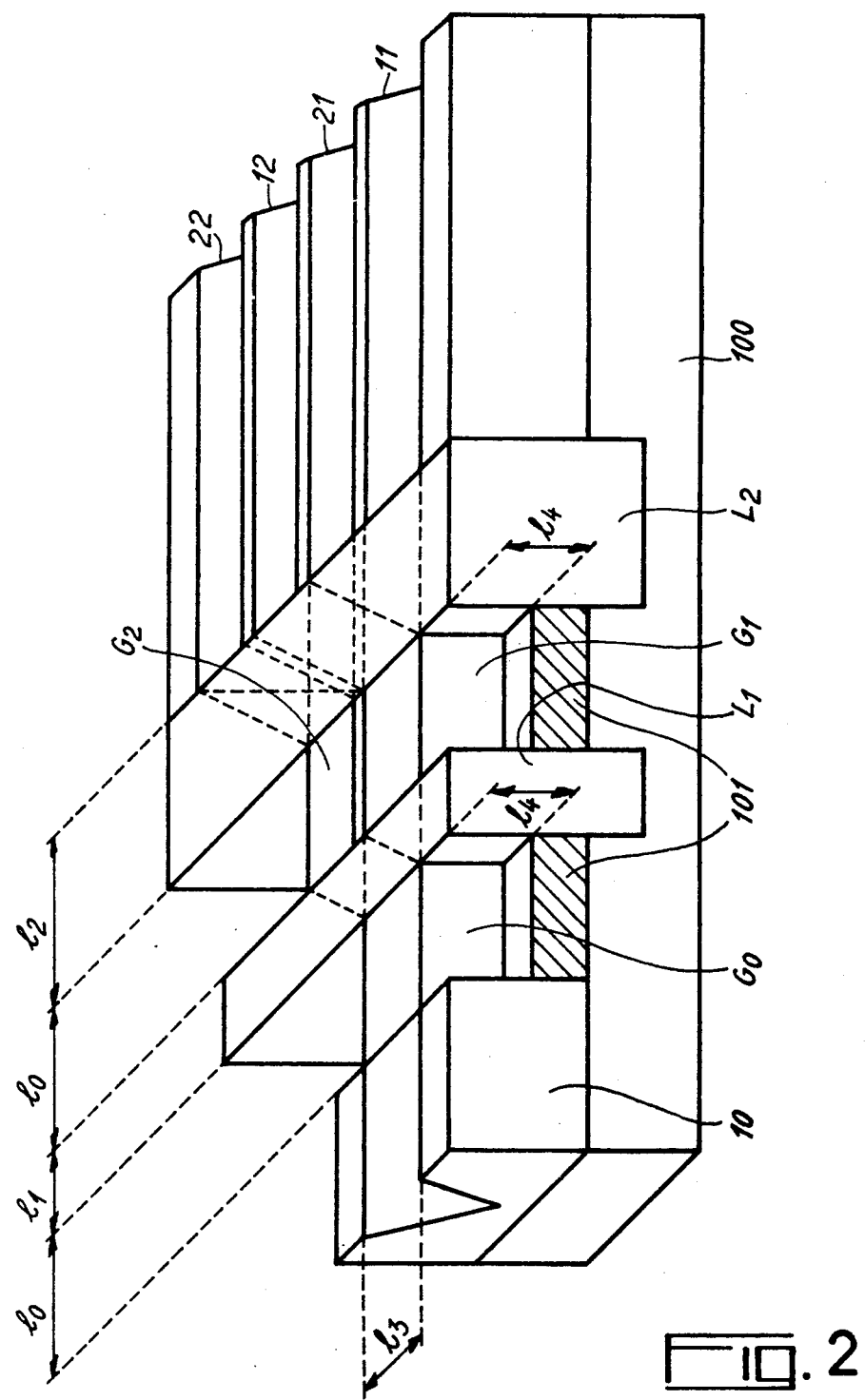
FIG. 2 represents a first embodiment of the branch connection according to the invention, the polarization rotation being achieved by the Faraday effect in a magneto-optical material.

FIG. 2 represents a compact embodiment of the optical branch connection according to the invention in which the control is a magneto-optical control. The same elements as in FIG. 1 have been designated by the same references. The device comprises a support 100 on which bear the various elements constituting the branch connection proper. It further comprises sectioned fibre supports, a fibre support 10 at one end of the support and four fibre supports 11, 12, 21 and 22 on which bear the fibres $F_{10}$, $F_{11}$, $F_{12}$, $F_{21}$ and $F_{22}$ respectively shown in FIG. 1 but not shown in FIG. 2 in order to render the latter more clear. The magneto-optical guides $G_0$ and $G_1$, $G_2$ are ferri-magnetic guides obtained by epitaxy on a non-magnetic garnet 101. By way of a non-limitative example the non-magnetic garnet may be gallium gadolinium garnet G.G.G. and the guides may be obtained from yttrium ion garnet Y.I.G. epitaxied on the G.G.G. garnet. The Y.I.G. garnet comprises preferably gallium and gadolinium substituted atoms so that the direction of magnetization of the material may be maintained in the plane of the layer or near to this plane. Such a layer is termed "easy magnetization in the plane layer". The magnetization is maintained in the plane of the layer by conventional electro-magnetic devices, for example a small magnet (not shown). Switchable additional electro-magnetic means permit the application of a magnetic field in a direction parallel to the direction of propagation when it is desired to deflect the radiation. These means may be an electro-magnetic coil which carries or does not carry current, as described before. This device has not been shown in FIG. 2. The length $l_0$ of the guides $G_0$, $G_1$ and $G_2$ formed in this way is such that the polarization of the incident radiation in these guides is turned through 90° by the Faraday effect. This length is a function of the angle of rotation by the Faraday effect in the material. By way of example, a length of 4 mm enables the polarization to be turned through 90° with an applied magnetic field of around 2 to 3 Oersteds. The radiation is thereafter guided in either the ordinary or extraordinary direction (depending on the direction of polarization) in the bi-refracting plates $L_1$ and $L_2$ made from rutile, the length of which is determined as a function of the angle of deflection and of the section of the output beam, so that the non-deflected and deflected radiation issues in zones which do not overlap. The rutile plates are cut in such manner that the incident and emergent faces make with its optical axes an angle which is such that the angle of deflection $\theta$ is maximum (in order to employ plates which are as short as possible). The angle $\theta$ may thus be equal to 0.1 rd. The first plate of rutile $L_1$ may consequently have a length $l_1$ equal to 1 mm and the second strip $L_2$ a length equal to 2 mm. The proportions of the device have not been employed in the drawing, the fibres having a diameter of around 50 $\mu$m, that is to say that the width $l_3$ of the guides $G_0$ and $G_1$, $G_2$ and their thickness $l_4$ are of the same order of magnitude, namely 50 $\mu$m.

Such an integrated branch connection in which the guiding and the polarization rotation are effected in a magneto-optical material is particularly adapted to the coupling with optical fibres. The optically polished faces of the fibres to be connected are held in contact with the ends of the guides or of the output bi-refracting plate, for example by means of a sealing material having a correct index or by direct contact.

Figure 3:
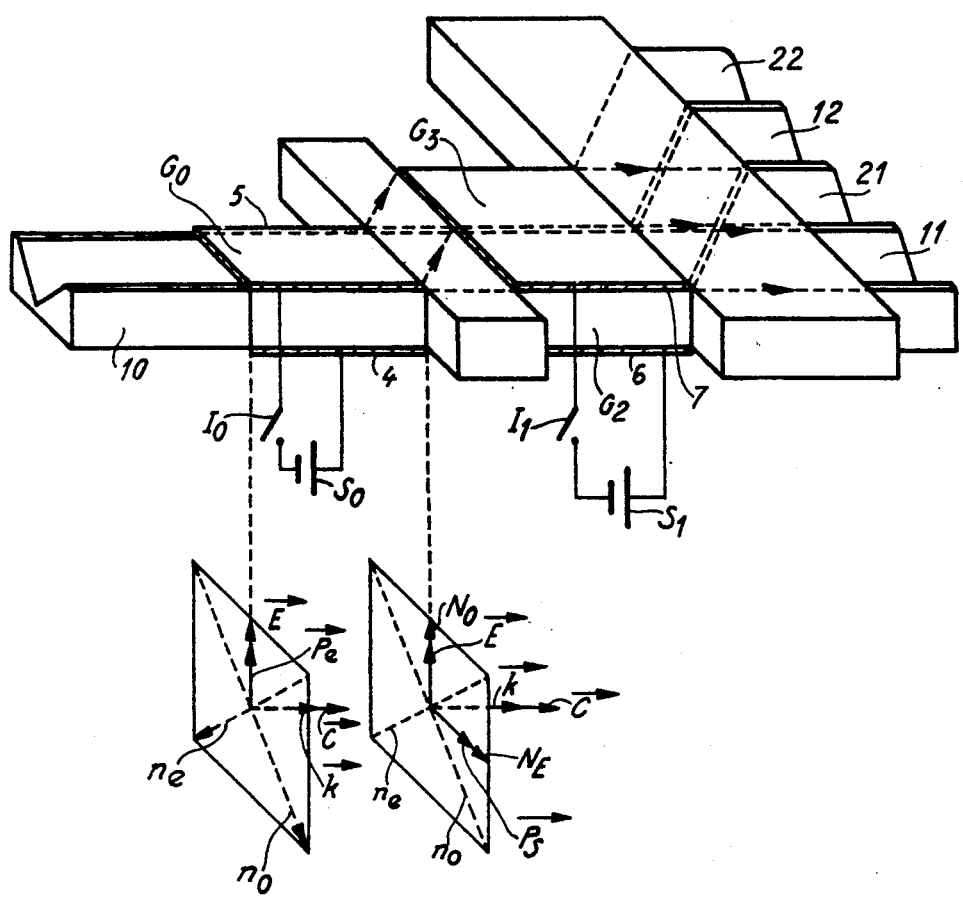
FIG. 3 represents a second embodiment of the branch connection according to the invention, the polarization rotation being achieved by application of a electric field in an electro-optical material.

FIG. 3 shows a second embodiment of an optical branch connection in which the change of orientation of the polarization of the incident radiation is effected, if need be, in a guide made from an electro-optical material.

The device comprises at one end a fibre support 10 and at the other end four fibre supports 11, 12, 21 and 22 as before, a branch connection having two stages being shown. The guides ensuring a change in the orientation of the polarization of the input radiation under electric control are here electro-optical guides. By way of example, they may be formed by lithium niobate. The control system is simply formed by electrodes 4 and 5 for the guide $G_0$, 6 and 7 for the guides $G_1$ and $G_2$, respectively connected to the sources of voltages $S_0$ and $S_1$ through switches $I_0$ and $I_1$ as shown in FIG. 1.

The electro-optical guides are oriented in such manner that there crystallographic axis $\vec{C}$ is oriented in the direction of propagation of the radiation, that is to say parallel to the wave vector $\vec{k}$, the neutral axes $n_e$ and $n_o$ of the guide being oriented at 45° to the polarization $\vec{P}e$ of the incident radiation. Thus the electric field $\vec{E}$ which may be applied to the guide to produce deflection by birefringence effect is orthogonal to the axis $\vec{C}$ and parallel to the polarization $\vec{P}e$. In the absence of an applied electric field, the guide does not introduce a polarization rotation $\vec{P}e$ and when a field is applied, the length of the guide is such that the polarization has turned through $\pi/2$: $\vec{P}e$ becomes $\vec{P}s$. For a radiation of wavelength $\lambda = 0.633$ $\mu$m, experience has shown that a source of voltage of 20V if sufficient to introduce this change in polarisation, which results in a propagation of the radiation in the extraordinary direction if the polarization of the radiation entering the guide corresponded to a propagation in the ordinary direction.

Figure 4:
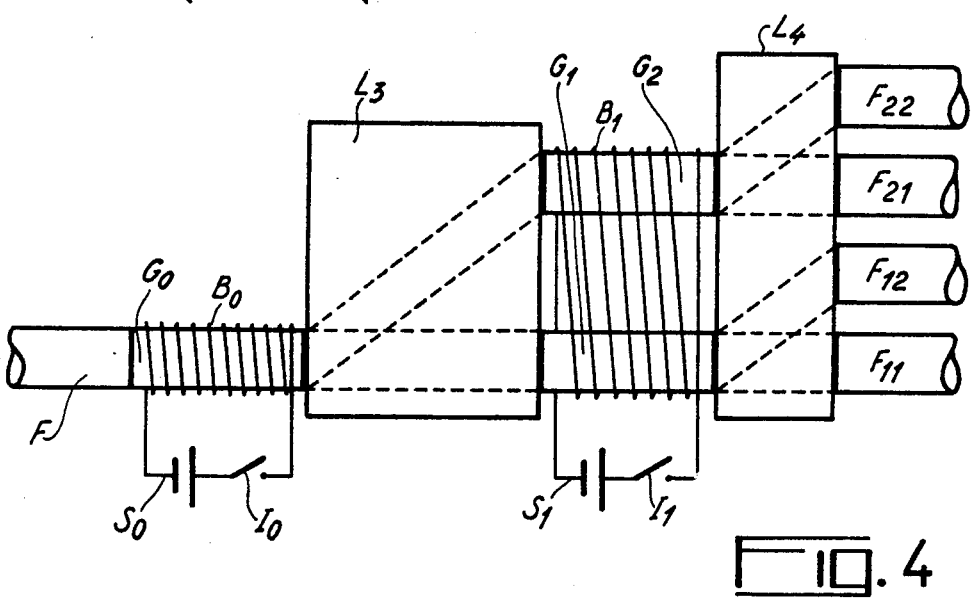
FIG. 4 represents diagrammatically in plan another embodiment of optical branch connection having two stages.

FIG. 4 represents diagrammatically another embodiment of the optical branch connection according to the invention in which the first bi-refracting plate $L_3$ has a length which is double that of the second bi-refracting plate $L_4$. The other elements of the branch connection similar to those shown in FIG. 1 are designated by the same references. The device operates in the same way as that shown in FIG. 1.

It was mentioned hereinbefore that the orientation of the polarization of the radiation entering the branch connection must be chosen to correspond to one of the neutral axes of the bi-refracting plates. As is difficult to control the polarization of the input radiation, it is possible to provide at each interface between an optical fibre and a guide a half-wave plate which may be rotated to orient the polarization issuing therefrom along one of the neutral axes of the bi-refracting plates.

Furthermore, on the drawings it has been supposed that the radiation emerging from the guides and transmitted to the bi-refracting plates was a parallel radiation. Practically the radiation emitted by the fibres is divergent because of the numerical aperture of the fibres, and it can be necessary to add, between the output faces of the fibres and the bi-refracting plates, converging lenses having adequate focal lengths, the radiation transmitted to the bi-refracting plates being thus approximately parallel.

The invention is not limited to the embodiments which have been described and shown. In particular, any guide in which it is possible to produce under electric control the polarization rotation through $\pi/2$ which is necessary to ensure deflection of the radiation may be employed to form in association with a bi-refracting plate a basic cell for an optical branch connection. The optical fibres employed may be fibres having a heart of given index and an outer sheath of lower index, or so-called "Selfoc" fibres in which the index $n_1$ of the heart is a quadratic function of the radius. Such fibres are periodically focusing and if the radiation is focused in particular at their ends, the problems of connection and coupling of the fibres may be solved, the losses introduced being relatively low.

Furthermore, if the focusing period of these fibres is such that the radiation emerging from an input fibre is focused on the input faces of the output fibres, it is possible to avoid the converging lenses on the radiation path.

The invention is in particular applicable to connection for optical telecommunications.

What we claim is:

1. An electrically controlled optical branch connection for optical fibres comprising an input fibre and at least two output fibres and a plurality of adjacent basic cells, each of which cells comprises at least one radiation guide coupled to said input fibre capable of introducing under electrical control, a change in the direction of polarization of an input optical radiation linearly polarized, the radiation having thus one of two possible directions of polarization, and a birefringent plate having a length, capable of ensuring the propagation of linerly polarized radiation along one of two directions according to the direction of polarization of the radiation transmitted thereto, the radiation emerging from said plate after porpagation along one and the other directions being spatially separated by a distance proportion to said length, said guide and said plate being fixed one relative to the other and said two possible directions of polarization at the output of said guide respectively corresponding to said two propagation directions in said plate.

2. An optical branch connection as claimed in claim 1, wherein the coupling between said input fibre and the radiation guide is a direct coupling.

3. An optical branch connection as claimed in claim 1, wherein the coupling between said input fibre and the radiation guide is effected by orientable half-wave plates.

4. An optical branch connection as claimed in claim 1, wherein said guides are magneto-optical guides, said cells further comprising electro-magnetic means, the polarization rotation being produced, when required, by the application of an electric signal to the terminals of said electro-magnetic means to produce in said guide a magnetic field in the direction of propagation of the radiation.

5. An optical branch connection as claimed in claim 4, wherein for a compact structure, said cells are placed on a non-magnetic substrate, said guides being formed by epitaxial growth of a magnetic material on said non-magnetic substrate.

6. An optical branch connection as claimed in claim 5, wherein said non-magnetic substrate is gallium gadolinium garnet, said magnetic material forming the guides being an yttrium ion garnet.

7. An optical branch connection as claimed in claim 6, wherein the magnetic material comprises substituted gallium and gadolinium atoms in the ytrium iron garnet.

8. An optical branch connection as claimed in claim 1, wherein said guides are electro-optical guides having crystallographic axes, one of said axes being oriented in the direction of propagation, said cells further comprising electrodes located on said guides, an electric control signal being applied between said electrodes to produce an electric field in the material in a direction perpendicular to the direction of propagation so as to produce a change in the direction of polarization.

9. An optical branch connection as claimed in claim 1, wherein the length of said guides is such that the polarization direction change produced, when required, under electric control is equal to $\pi/2$.

10. An optical branch connection as claimed in claim 1, wherein said at least two output fibres includes $2^n$ output fibres wherein n is the number of said plurality of basic cells, the length of the birefringent plate of one cell being respectively double the length of the birefringent plate of the preceding cell, and one half the length of the birefringent plate of the succeeding cell.

11. An optical branch connection as claimed in claim 10, wherein the birefringent plates are rutile plates.

12. An optical branch connection as in claim 1 wherein said plurality of basic cells includes a first basic cell and a second basic cell, said first cell having a first radiation guide; the birefringent plates of said first and second cells each having an input face and an output face; the locations of emergence of the radiation emerging from the birefringent plate of said first cell after propagation along first and second paths originating at said first radiation guide being located on said first cell birefringent plate output face and defining first and second first cell outputs; said second cell having second and third radiation guides, said second and third radiation guides respectively coupling said first and second first cell outputs to first and second input locations on the input face of the birefringent plate of said second cell such that radiation received at said first and second input location respectively emerges at one of a first two spaced locations and one of a second two spaced locations on the output face of the birefringence plate of said second cell, depending on the direction of polarization of the radiation, and said first two locations being mutually spaced from said second two locations.

13. An optical branch as in claim 12 wherein one of said first and second cells has twice the length of the other.

* * * * *